United States Patent [19]

Krzes

[11] 4,063,600
[45] Dec. 20, 1977

[54] POWER TOOL SAFETY MECHANISM

[76] Inventor: Casey S. Krzes, 1198 Meadow Lane, Grand Island, N.Y. 14072

[21] Appl. No.: 683,505

[22] Filed: May 5, 1976

[51] Int. Cl.² ............................................. B23Q 5/027
[52] U.S. Cl. ...................................... 173/12; 310/50; 310/68 B
[58] Field of Search .................... 173/12, 18; 175/170; 200/153 T, 157; 307/94, 119; 310/50, 68 B, 68 E; 91/220

[56] References Cited

U.S. PATENT DOCUMENTS

| 1,751,781 | 3/1930 | Weiss | 310/68 B |
| 3,173,417 | 3/1965 | Horner | 310/50 |
| 3,221,192 | 11/1965 | Franklin | 310/50 |
| 3,854,020 | 12/1974 | Glover et al. | 200/157 |

*Primary Examiner*—Robert A. Hafer
*Attorney, Agent, or Firm*—Christel & Bean

[57] ABSTRACT

In a portable motor driven tool such as a drill, a handle is connected to the housing in a manner permitting limited relative movement, in particular pivotal movement, between housing and handle. Biasing springs maintain the handle in a first position, and a normally-closed switch in series with the tool motor has an operator element engaging the handle. If the tool becomes stuck in a workpiece during operation, the sudden reverse force acting between the handle and housing overcomes the spring bias force causing relative movement between handle and housing to open the switch and break the motor electric circuit thereby preventing safety hazards and damage.

8 Claims, 4 Drawing Figures

POWER TOOL SAFETY MECHANISM

BACKGROUND OF THE INVENTION

This invention relates to the art of portable motor-driven tools, and more particularly to a new and improved safety measure for such tools.

One area of use of the present invention is in portable motor-driven tools where the work output is provided by a rotating shaft, although the principles of the present invention can be variously applied. In the operation of portable motor-driven tools, for example drills, automatic screwdrivers, tappers, tube expanders and the like, it sometimes happens that during use the tool, such as a drill bit, becomes stuck or lodged in the workpiece. If this happens, the entire motor reaction force then is transferred to the housing which normally is held in the operator's hand. If the tool becomes stuck in the workpiece suddenly, the resultant sudden reverse torque may be sufficiently great to cause the operator to lose his grip on the tool and even to be forced off balance himself. The foregoing presents safety hazards and possibility of serious personal injury and also costly damage to equipment.

SUMMARY OF THE INVENTION

It is, therefore, a principle object of the present invention to provide a new and improved portable motor-driven tool with an effective safety measure operative if the tool becomes stuck or lodged in a workpiece during operation thereof.

It is a further object of this invention to provide such a safety measure which stops power to the portable motor-driven tool if the tool becomes stuck or lodged in a workpiece during operation thereof.

It is a further object of this invention to provide such a safety measure which is effective yet does not interfere with normal operation of the portable motor-driven tool.

It is a further object of this invention to provide such a safety measure for a portable motor-driven tool which is relatively simple in construction and easy and economical to manufacture.

The present invention provides in a portable motor-driven tool including a motor housing, a motor operatively disposed within the housing, an electric circuit for the motor and a handle for grasping by the user during operation of the tool, a safety measure comprising means connecting the handle to the housing in a manner permitting limited movement, in particular pivotal movement, of the handle with respect to the housing between first and second positions, and a normally-closed switch in the motor circuit having a switch operator element operatively connected to the handle such that the switch is closed when the handle is in the first position. The handle is maintained in the first position by biasing means. In response to a force acting between the housing and the handle sufficient to overcome the biasing means, such as when the tool happens to become stuck or lodged in a workpiece during operation, the handle is moved to the second position opening the switch to break the motor electric circuit.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
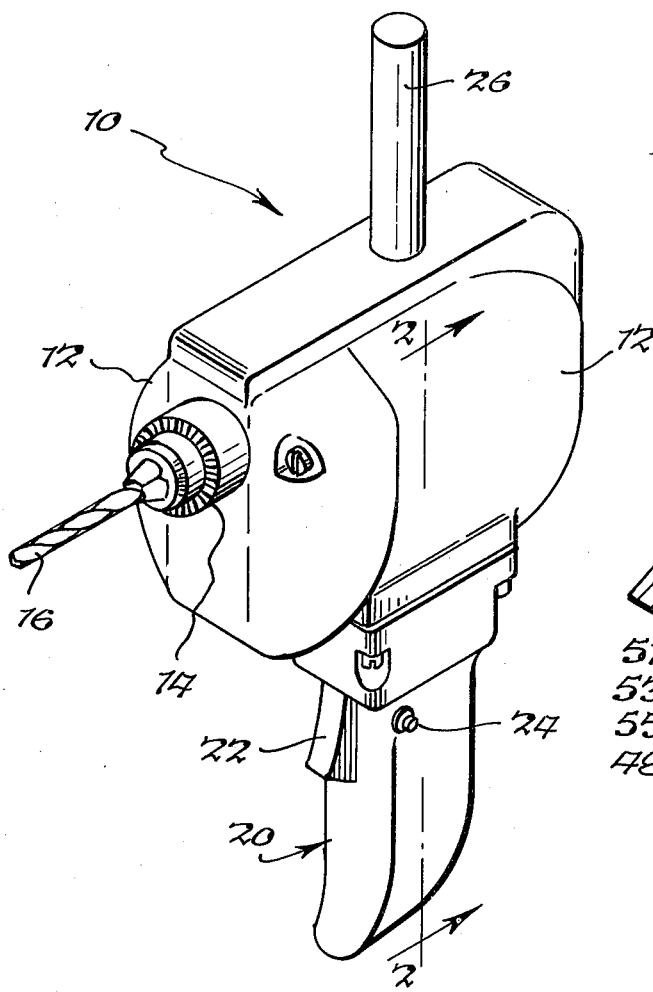
FIG. 1 is a perspective view of a portable motor driven tool provided with a safety mechanism according to the present invention.

Referring now to FIG. 1, a portable, motor-driven tool having a safety mechanism according to this invention is generally designated 10, and in the present instance the tool is in the form of a hand-held power drill. While the present invention will be illustrated in connection with a portable power drill, the invention is applicable to other varieties of portable motor-driven tools, for example automatic screw drivers, tappers, tube expanders and the like. The power tool 10 includes a housing 12 and an electric motor (not shown) operatively disposed withon housing 12 in a known manner. The output drive shaft of the motor within housing 12 is drivingly connected to a conventional chuck assembly 14 extending out from housing 12 and a standard drill bit 16 is received and held in the chuck 14 in a known manner.

The tool is provided with a handle generally designated 20 which is elongated and extends outwardly from housing 12. In the present illustration the drill 10 is provided with a trigger-like control switch operator 22 located on the handle 20 adjacent the end nearest to the housing 12. Switch 22 controls the on-off states of power tool 10 in a known manner, and also as in some commercially available hand power drills it can control the speed of operation. A relatively smaller auxiliary switch 24 can be included on handle 20 for providing additional control modes in a known manner. The portable power drill 10 can include an additional handle 26 which is elongated and fixedly attached at one end to the housing 12 so as to extend outwardly from the housing at a location generally opposite the location of handle 20.

In accordance with the present invention, handle 20 is connected to housing 12 in a manner permitting limited movement of handle 20 with respect to housing 12 between first and second positions. In particular, and referring now to FIGS. 2 and 3, housing 12 includes an interior chamber or open region designated 30 which communicates with an opening in the wall of housing 12. An electrical switch 32 is located within chamber 30 adjacent the opening in the housing wall surface. Switch 32 is fixedly mounted in housing 12 by a suitable means such as the screw and bolt type fastners shown in FIGS. 2 and 3 and includes a switch operator element 36. Switch 32 is located and disposed so that operator 36 is located adjacent the plane of the opening in the wall of housing 20. Switch 32 can be of various commercially available types being small in size and having electrical current carrying capability required in tools of this general type. Switch 32 has an adjustment screw designated 38 for setting the initial position of operator 36. Handle 20 is positioned such that one end thereof is adjacent housing 12 to cover the opening which leads into chamber 30. In particular, handle 20 is formed to include a relatively flat planar end surface 40 extending over substantially all of the one end of handle 20. When handle 20 is in assembled position in the tool 10, the surface 40 is in operative contact with the switch operator element 36 and the marginal or peripheral surface 42 of handle 20 adjacent surface 40 is substantially flush with a corresponding outer peripheral surface 44 of the portion housing 12 surrounding the opening leading to region 30.

Figure 2:
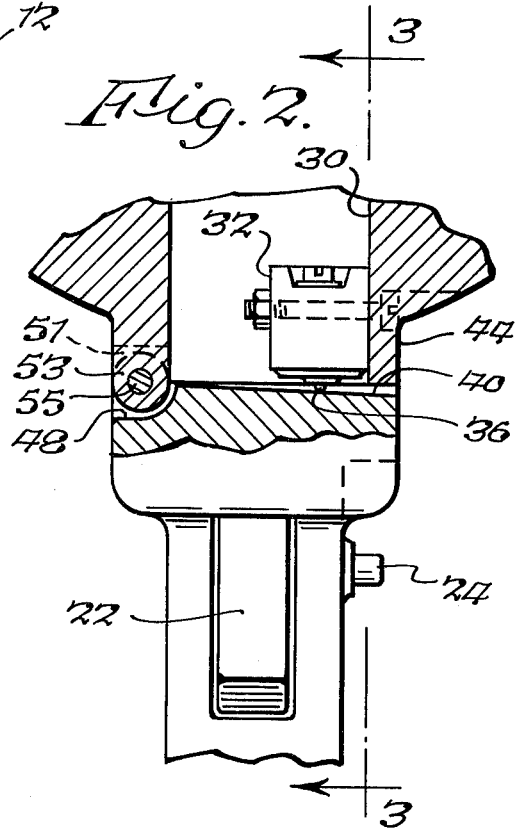
FIG. 2 is a fragmentary vertical sectional view taken about on line 2—2 of FIG. 1.

Handle 20 is pivotally connected to housing 12, and one illustrative pivotal connection includes the arrangement of a central elongated recess 48 provided along one edge of the end of handle 20 which is boardered or terminated at opposite ends thereof by a pair of upstanding relatively short leg elements 50, 51. Recess 48 is curved and extends from end surface 40 to peripheral surface 42. Housing 12 is formed to include a projection or extension 53 along the edge thereof leading from surface 44 and adjacent the recess 48 in handle 20. The extension of flange 53 has a length slightly less than the length of recess 48 and is curved or rounded along the lower edge thereof as illustrated in FIG. 2. When handle 20 and the housing 12 are assembled together, the projecting portion 53 fits into the recess 48 formed in the handle, and the housing is provided with recesses at opposite ends of the projection 53 to receive the upstanding leg elements 50, 51. The handle and housing then are pivotally connected together by a shaft or rod-like element 55 which extends substantially along the entire length of the one end of the assembly and which is rotatably received in the extension 53 and the upstanding leg elements 50, 51. The pin 55 is rotatably connected in these parts and fixed by suitable means against longitudinal or axial movement. Thus handle 22 and housing 12 are pivotally connected together along one common edge portion of the two components. Other mechanical arrangements can of course be employed to provide a pivotal connection between housing 12 and handle 20.

Figure 3:
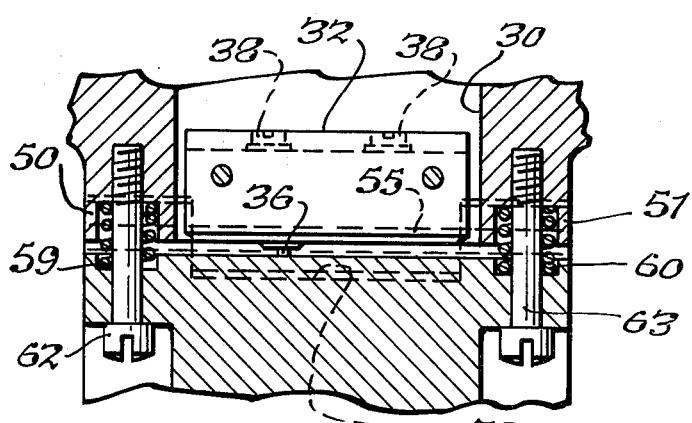
FIG. 3 is a sectional view taken on line 3—3 of FIG. 2.

The apparatus of the present invention also comprises biasing means for maintaining the handle 20 in a first or normal position relative to housing 12. The biasing means is located adjacent the common edges of the handle end and the housing spaced from and opposite the location of the pivotal connection. In the present illustration, the biasing means comprises a pair of spaced apart coil springs 59, 60 each of which springs has one end operatively engaging housing 12 and the other end operatively engaging handle 20. As shown in FIG. 3, the one end of spring 59 is seated in a recess provided in the end surface 40 of handle 20, and the opposite end of spring 59 is received in a recess or short bore provided in the wall of housing 12 and which is in alignment with the spring-receiving recess formed in the end of handle 20. Similarly, the one end of spring 60 is received or seated in a recess provided in the end surface 40 of handle 20, and the opposite end of spring 60 is received in an aligned recess or short bore provided in housing 12. A pair of bolts 62, 63 are operatively connected to handle 20 and housing 12 adjacent the biasing springs 59, 60 in a manner limiting the relative movement between the two parts. In the present illustration, bolt 62 is received in aligned bores in the handle and housing having a common axes coincident with the longitudinal axis of spring 59, the bolt 62 extending along and within spring 59. Bolt 62 is threadably connected in the wall of housing 12, and the head of bolt 62 abuts an external surface of handle 20. Similarly, bolt 63 is received in aligned bores in the handle and housing having a common longitudinal axis coincident with the axis of spring 60, the bolt 63 extending along and within spring 60. One end of bolt 63 is threadably connected in the wall of housing 12, and the head end thereof abuts an external surface portion of handle 20. The heads of bolts 62, 63 thus are externally available to permit adjustments.

The power drill of the present illustration is the type of tool wherein the motor drive shaft is coupled to a tool, i.e. the drill bit, to provide an output in the form of rotation of the bit. The motor drive shaft and tool or bit have a common axis. Handle 20 is pivotally connected to housing 12 along a pivot axis which is parallel to the axis of the drive shaft and tool and which pivot axis is offset from the drive shaft and tool axis. The biasing springs 59, 60 engage the housing and handle at a location spaced from the pivot axis and spaced from the common axis of the drive shaft and tool.

Figure 4:
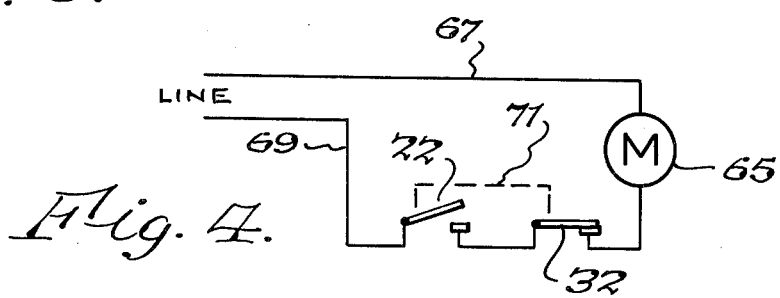
FIG. 4 is a schematic diagram of the electrical circuit in the tool of FIG. 1.

FIG. 4 is a schematic diagram of the electric power circuit of the tool of the present invention including the electric drive motor 65 of the tool which is connected by a line 67 to one terminal of a conventional plug for connection to an electrical power outlet. The other terminal of motor 65 is connected through the series combination of the main control switch 22 and the safety switch 32 of this invention to another line 69 which, in turn, is connected to the other terminal of the electrical plug. The broken line 71 in FIG. 4 represents an operative mechanical connection between these two switches as will be described in further detail presently.

In operation, the portable motor driven tool 10 is held by hand, either by the operator grasping handle 20 with one hand or grasping both handles 20, 26 with his two hands. Switch 32 normally is closed and the operator moves the main switch 22 to a closed porition by pressing it with his finger in a trigger-like fashion. With the plug being connected to an electrical outlet, the power circuit is completed and motor 65 is energized. The drill bit 16 is rotated, conventionally in a counter-clockwise direction for forward operation, and is moved toward and into a workpiece for drilling holes in the usual manner.

During normal operation of tool 10, handle 20 is maintained in a position relative to housing 12 which keeps switch 32 closed. In particular, handle 20 remains in a position such that a small gap is present between handle end surface 40 and the opposed surface of housing 12 as shown in FIGS. 2 and 3. This is provided by the biasing means in the form of springs 59, 60 which have force constants of sufficient magnitude. The springs 59, 60 should exert a biasing force at least great enough to overcome an opposing force resulting from the weight of the tool 10, friction between drill bit 16 and the workpiece and any other ordinary forces which arise during operation of the tool and act in a direction opposing the biasing force of the springs 59, 60.

During normal operation of tool 10, the output force or torque from the motor is applied to the workpiece and results in work being done thereon, such as drilling holes, advancing or removing screws, expanding tubes and the like. Should the tool happen to become stuck or lodged in the workpiece, however, the entire motor reaction force is transferred to housing 12 which is held in the user's hands. By virtue of the safety measure of the present invention, this causes relative movement between housing 12 and handle 20 to open switch 32 to shut off the tool motor thereby avoiding serious injury to the user and those nearly as well as avoiding damage to the tool and associated equipment and materials. In particular, the motor reaction force transferred to housing 12 is considerably greater than the bearing force of springs 59, 60 with the result that the end surface 40 of handle 20 and the opposed surface of housing 12 are moved together closing the gap therebetween. The surface 40 moves switch operator element 36 to a position opening switch 32 which is in series with motor 65 thereby breaking the motor power circuit and stopping motor operation. This of course removes the force or torque which otherwise could cause injury or damage in the situation where the tool is stuck or lodged in the workpiece.

The mechanical interconnection designated 71 in FIG. 4 between switches 22 and 32 illustrates one possible arrangement whereby opening of switch 32 opens the main power switch 22. With such an arrangement when a lodges tool causes operation of safety switch 32, the switch 22 would be opened until the operator releases his grip on switch 22 and presses it again to restart the motor. Another possible arrangement would be a mechanical interconnection between switch 32 and the auxiliary switch 24 such that once switch 32 is opened it remains open until the operator presses the switch 24.

Various modifications can be made in the arrangement and location of safety switch 32 in relation to housing 12 and handle 20 which satisfy the operational requirement that the reverse force or torque arising from a lodged or stuck tool causes relative movement between housing 12 and handle 20 to operate switch 32 to deactivate the tool motor. For example, the switch 32 could be located in a recess provided in handle 20 and disposed such that the switch operator element 36 is operatively associated with housing 12 and in a manner providing the foregoing operation. The location of the first or normal position of handle 20 relative to housing 12 can be adjusted by rotating the bolts 62, 63.

The safety mechanism of the present invention for portable motor driven tools is effective in preventing personal injury and property damage which otherwise can occur when the tool becomes lodged or stuck in a workpiece during operation. The foregoing is provided by an arrangement which is highly effective yet relatively simple in construction and easy and economical to manufacture in existing tool constructions.

It is therefore apparent that the present invention accomplished its intended objects. While a single embodiment of the present invention has been described in detail, this is for the purpose of illustration, not limitation.

I claim:

1. In a portable motor driven tool, a motor housing, a motor operatively disposed within said housing, an electrical circuit for said motor, a control switch in said circuit for controlling the supply of electrical power to said motor, a handle for grasping by the user to hold said tool during operation thereof, means connecting said handle to said housing in a manner permitting limited movement of said handle with respect to said housing between first and second positions, a normally-closed switch in said circuit and operatively mechanically connected to said handle and said housing such that said switch is closed when said handle is in said first position and said switch is open when said handle is in said second position, biasing means normally maintaining said handle in said first position, whereby in response to a force acting between said housing and said handle sufficient to overcome said biasing means, said handle is moved to said second position thereby opening said switch to open said electrical circuit for said motor.

2. Apparatus according to claim 1, further including a second handle fixed to said housing at a location generally opposite said movably connected handle.

3. Apparatus according to claim 1 further including stop means operatively connected to said housing and to said movable handle for limiting the amount of relative movement between said housing and said handle.

4. Apparatus according to claim 1, wherein said normally-closed switch is located in said housing and has a switch operator element operatively engaging said handle.

5. In a portable motor driven tool, a motor housing, a motor operatively disposed within said housing and having a rotary output drive shaft, an electrical circuit for said motor, means in said circuit for controlling the supply of electrical power to said motor, a handle for grasping by the user to hold said tool during operation thereof, means connecting said handle to said housing in a manner permitting limited movement of said handle with respect to said housing between first and second positions, said handle being pivotally connected to said housing about an axis disposed parallel to the axis of said motor shaft, a normally-closed switch in said circuit and operatively mechanically connected to said handle and said housing such that said switch is closed when said handle is in said first position and said switch is open when said handle is in said second position, biasing means normally maintaining said handle in said first position, whereby in response to a force acting between said housing and said handle sufficient to overcome said biasing means, said handle is moved to said second position thereby opening said switch to open said electrical circuit for said motor.

6. In a portable motor driven tool, a motor housing, a motor operatively disposed within said housing, an electrical circuit for said motor, means in said circuit for controlling the supply of electrical power to said motor, a handle for grasping by the user to hold said tool during operation thereof, means connecting said handle to said housing in a manner permitting limited movement of said handle with respect to said housing between first and second positions, a normally-closed switch in said circuit and operatively mechanically connected to said handle and said housing such that said switch is closed when said handle is in said first position and said switch is open when said handle is in said second position, biasing means normally maintaining said handle in said first position, said biasing means comprising spring means having one end operatively engaging said housing and another end operatively engaging said handle, whereby in response to a force acting between said housing and said handle sufficient to overcome said biasing means, said handle is moved to said second position thereby opening said switch to open said electrical circuit for said motor.

7. Apparatus according to claim 6, wherein said spring means exerts a biasing force at least equal to the weight of said tool.

8. In a portable motor driven tool, a motor housing, a motor operatively disposed within said housing, an electrical circuit for said motor, means in said circuit for controlling the supply of electrical power to said motor, a handle for grasping by the user to hold said tool during operation thereof, said handle being elongated having one end adjacent said housing, means pivotally connecting said handle at said end to said housing along an axis generally perpendicular to the longitudinal axis of said handle in a manner permitting limited movement of said handle with respect to said housing between first and second positions, a normally-closed switch in said circuit and operatively mechanically connected to said handle and said housing such that said switch is closed when said handle is in said first position and said switch is open when said handle is in said second position, biasing means normally maintaining said handle in said first position, said biasing means comprising spring means between said housing and said end of said handle and spaced from said pivotal connection, whereby in response to a force acting between said housing and said handle sufficient to overcome said biasing means, said handle is moved to said second position thereby opening said switch to open said electrical circuit for said motor.

* * * * *